United States Patent
Oberg et al.

(10) Patent No.: US 8,414,395 B2
(45) Date of Patent: Apr. 9, 2013

(54) STRUM PROCESSING FOR MUSIC VIDEO GAME ON HANDHELD DEVICE

(75) Inventors: Gregory Keith Oberg, Troy, NY (US); Jeremy Russo, Albany, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 1174 days.

(21) Appl. No.: 12/137,489

(22) Filed: Jun. 11, 2008

(65) Prior Publication Data

US 2009/0312102 A1 Dec. 17, 2009

(51) Int. Cl.
*A63F 9/24* (2006.01)

(52) U.S. Cl.
USPC .......... 463/37; 463/29; 463/35; 84/645; 84/646

(58) Field of Classification Search .......... 463/37, 463/29; 84/612; 340/995
See application file for complete search history.

(56) References Cited

U.S. PATENT DOCUMENTS

| | | | |
|---|---|---|---|
| 6,657,616 B2 | 12/2003 | Sims | |
| D524,870 S | 7/2006 | Sugino et al. | |
| 7,309,287 B2 | 12/2007 | Miyamoto et al. | |
| 2005/0164794 A1* | 7/2005 | Tahara | 463/43 |
| 2006/0101354 A1 | 5/2006 | Hashimoto et al. | |
| 2006/0116203 A1* | 6/2006 | Nakada et al. | 463/30 |
| 2007/0080831 A1* | 4/2007 | Miyamoto et al. | 340/995.28 |
| 2007/0177801 A1 | 8/2007 | Kawamoto et al. | |
| 2007/0221046 A1* | 9/2007 | Ozaki et al. | 84/612 |
| 2007/0265081 A1* | 11/2007 | Shimura et al. | 463/37 |
| 2007/0279394 A1 | 12/2007 | Lampell et al. | |
| 2008/0280680 A1* | 11/2008 | Dutilly et al. | 463/36 |
| 2009/0258702 A1* | 10/2009 | Flores et al. | 463/35 |

OTHER PUBLICATIONS

"Nintendo DS Lite," Instruction Booklet, Nintendo of America Inc., 2006. 15 pgs.

* cited by examiner

*Primary Examiner* — Arthur O. Hall
*Assistant Examiner* — Mukund G Patel
(74) *Attorney, Agent, or Firm* — Klein, O'Neill & Singh, LLP (57) ABSTRACT

A handheld video game system provides a music video game including a guitar simulation. Operation of the handheld video game system is designed to simulate, to a certain extent, the playing of a real guitar. The handheld video game system typically includes a touch sensitive screen, whereby certain actuation and stroke motions made along the surface of the touch sensitive screen are processed by the handheld video game system as simulated guitar strums. Sets of criteria are implemented by the handheld video game system to determine whether a particular stroke motion is processed and registered as a valid strum.

5 Claims, 6 Drawing Sheets

STRUM PROCESSING FOR MUSIC VIDEO GAME ON HANDHELD DEVICE

BACKGROUND OF THE INVENTION

The present invention relates generally to video games, and more particularly to a music video game playable using a handheld video game device.

Video games provide a source of enjoyment and entertainment to many. Video games may provide interactive experiences involving simulations of a wide range of activities, many of which may be inaccessible or require difficult to acquire skill sets in real life. Amongst the various types of simulations video games provide are music based video games. Many music based video games involve the simulated play of a variety of different instruments, such as drum sets and guitars. Some of the music based video games involve special video game controllers designed to replicate the real instrument counterparts. While providing their own sets of challenges, music based video games are generally designed to be easier to participate in and perform on than their real world counterparts, providing to users a medium to express their musical talents on instruments they may not otherwise be able to play or experience.

Some video games may be provided for various portable devices. Using handheld video game systems, users may enjoy interactive experiences while traveling, or in locales where it may be overly cumbersome to transport larger video game consoles. Unfortunately, handheld video game systems generally include limited input and output capabilities, which may decrease enjoyment of particular interactive experiences.

SUMMARY OF THE INVENTION

The invention provides input processing, for example, strum processing, for a video game, for example, a music video game, on a handheld device, for example, a handheld video game device. In one aspect, the invention provides a method of generating input signals on a touch sensitive surface, comprising: receiving an actuation at a contact point along a touch sensitive surface; detecting movement of the contact point in a first direction; and detecting movement of the contact point in a second direction; wherein an input signal is generated if the movement of the contact point in the first direction intersects at least a first predefined number of sensor points on the touch sensitive surface; wherein an input signal is generated if the movement of the contact point in the second direction intersects at least a second predefined number of sensor points on the touch sensitive surface, and if the angle formed between a vector in the first direction and a vector in the second direction falls within a predefined window of angles.

In another aspect, the invention provides a method of generating input signals from a touch screen, comprising: defining an array of sensor points on a touch screen; receiving an actuation at a contact point along the touch screen; detecting movement of the contact point in a one direction; generating an input signal when the movement of the contact point in the one direction intersects at least a predefined number of sensor points of the array; detecting movement of the contact point in a further direction; and generating a further input signal when the movement of the contact point in the further direction intersects at least a further predefined number of sensor points of the array and the one direction and the further direction are substantially opposite directions.

In yet another aspect, the invention provides a handheld music video game, comprising: a display; a touch screen input; a plurality of fret inputs; and a processor, the processor including program instructions for: commanding a display of instructive cues on the display, the instructive cues indicating desired operation of the touch screen input and the plurality of fret buttons; receiving a strum along the surface of the touch screen input; receiving status information of the plurality of fret inputs at the time of the strum; determining compliance with the instructive cues; and generating audio and video output information based on accuracy of compliance; wherein a strum is received when properties of an actuation along the surface of the touch screen input meet a set of predefined criteria.

These and other aspects of the invention are more fully comprehended upon review of the disclosure.

DETAILED DESCRIPTION

Figure 1:
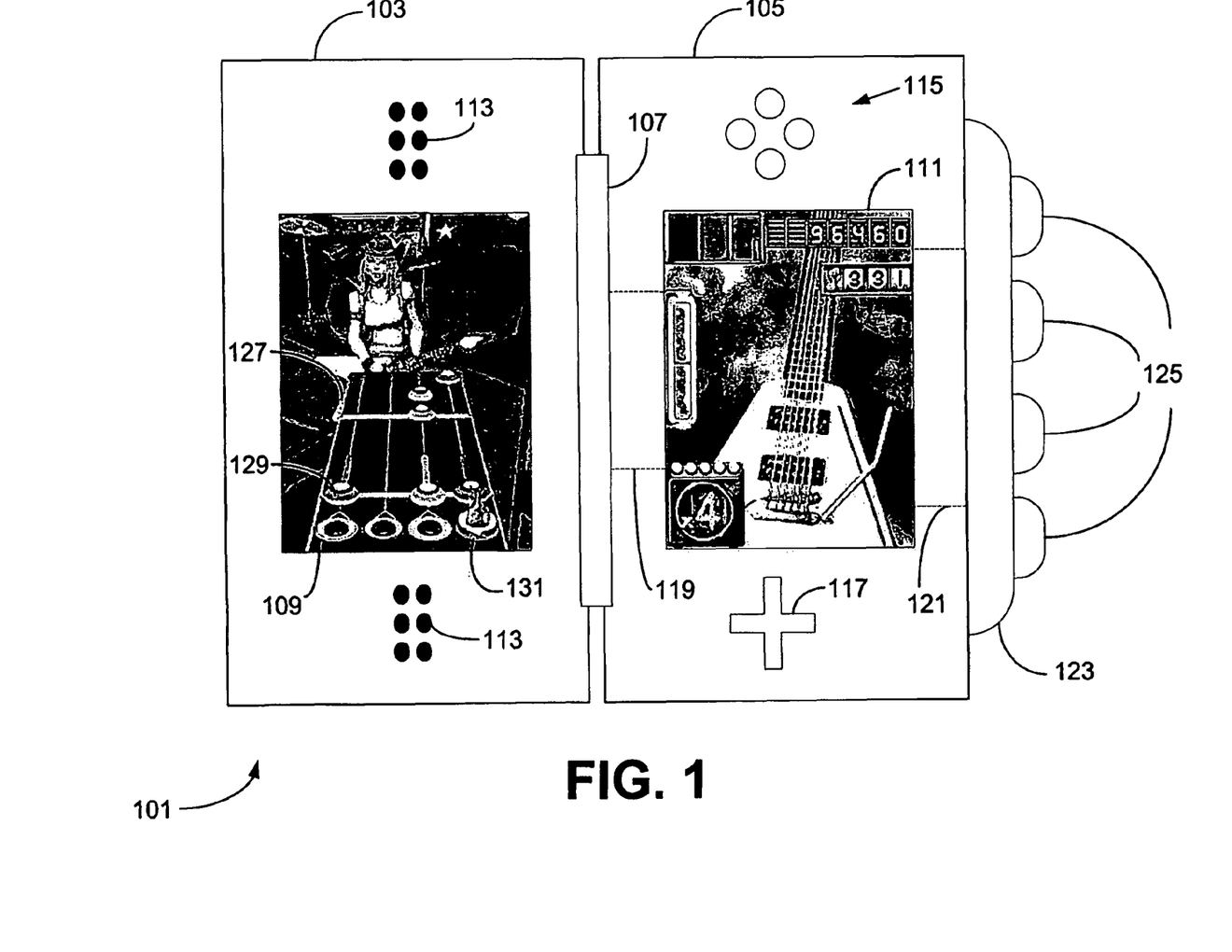
FIG. 1 illustrates a handheld video game system in accordance with aspects of the invention.

FIG. 1 illustrates a handheld video game system in accordance with aspects of the invention. The handheld video game system includes a handheld gaming device 101, and a peripheral device 123 attached to the handheld gaming device.

The handheld gaming device is a standalone device, which generally is capable of being operated without being connected to other devices. In FIG. 1, the handheld gaming device incorporates a clamshell design, and includes a first portion 103, a second portion 105, and a hinge 107 which provides for closure of the handheld gaming device and protection of the device's components when the device is not in use.

In FIG. 1, the first portion of the handheld gaming device includes a first display screen 109 and a pair of audio output devices 113, which may be, for example, a pair of speakers. The second portion of the handheld gaming device includes a second display screen 111, and a variety of input devices, including a plurality of input buttons 115 and a multi-directional control pad 117. In some embodiments, either the first display screen or the second display screen, or both, may include touch screen capabilities or similar touch sensitive properties, and detects contact made about or against the screen, either from a finger of a user or a stylus or similar actuator. Some embodiments may include a single screen in lieu of the dual screen configuration presented in FIG. 1.

The handheld gaming device of FIG. 1 also includes internal circuitry associated with processing video game instructions. The handheld gaming console generally includes at least one processor, memory, and various different types of interface circuitry. The interface circuitry may include a removable memory interface 119 for interfacing with removable memory sources, such as video game cartridges storing program instructions for specific video games, and a peripheral interface 121 for, for example, interfacing with different add-on accessories designed for use with specific video games.

In FIG. 1, a peripheral device 123 has been inserted into the peripheral interface of the handheld gaming device, and includes a plurality of fret inputs 125. As can be seen through the screen shots provided on the two displays, a music video game involving a guitar simulation is being processed by the handheld gaming device. The guitar simulation may be part of a music video game, for example, a rhythm based music game, and a removable memory device, such as a game cartridge which may store program instructions for the video game, may be inserted into the removable memory interface. In some embodiments involving a music video game, operation of the handheld gaming device may simulate the playing of, for example, a guitar. In these embodiments, a user of the handheld gaming device may hold the device so that the fingers of one hand rest over the fret inputs, where different combinations of the fret inputs may simulate guitar note and chord fingerings. A second free hand of the user may be used as a strumming hand, to simulate the strumming of a guitar, or other guitar techniques, for example, finger tapping or individual notes in a multi-note chord.

The screen shot on the first display shows a music track 127 including a plurality of gem-shaped instructive cues, for example, gem 129. The instructive cues provide users with instructions as to how to operate the fret buttons on the peripheral device. As can be seen in the screen shot in FIG. 1, there are four columns on the music track and four fret inputs on the peripheral device. Therefore, in the embodiment of FIG. 1, each column may correspond to one of the fret inputs, whereby an instructive cue located in one of the columns instructs a user to depress the corresponding fret input. The instructive cues may scroll, for example, from a top of the music track to a bottom of the music track. The screen shot further includes a timing bar 131 located at the bottom of the track. As each set of instructive cues scrolls past the timing bar, users are instructed to perform a strum while executing the fret combination indicated by the set of instructive cues crossing the timing bar.

The screen shot on the second display includes a visual display of a portion of a guitar 133, including a guitar body, a guitar neck, and a series of guitar strings. The screen shot also includes a plurality of user game play information, such as power meters and user scores. In most embodiments of the invention, the second display is a touch screen display, which may detect contact made to the surface of the display. In some embodiments, a strum may be performed by the user by performing a stroke, that is touching and moving a stylus or similar actuator, back and forth along and/or across a portion or portions of the surface of the touch screen display. The guitar displayed on the touch screen display may encourage users to run the actuator substantially perpendicular to the direction of the guitar strings, although in many embodiments, a strum stroke may be performed in any direction and on any portion along the touch screen display.

In some embodiments, a processor of the device, configured, for example, by program instructions in memory, determines occurrence of a strum stroke if contact is made over a predefined distance of the touch screen display after a first contact, In some embodiments, occurrence of a strum stroke is determined if contact is made over a second predefined distance of the touch screen display following a first predefined distance, if an angle formed between a vector representative of the first distance and a vector representative of the second distance is within a predefined window of angles.

In operation, a user may operate the fret inputs and perform strums in compliance with instructive cues displayed on the music track. The executed fret combinations and strum strokes generate input signals, which are received by the processor of the handheld gaming device, and processed to determine a level of compliance with the presented instructive cues. User scores and other game play status indicators may be updated based on the level of compliance. In most embodiments, the operation of the handheld gaming device in such a music video game simulates the play of a guitar. Video animations and audio outputs, such as guitar-based audio samples, are generated based on user operation of the handheld gaming device.

Figure 2:
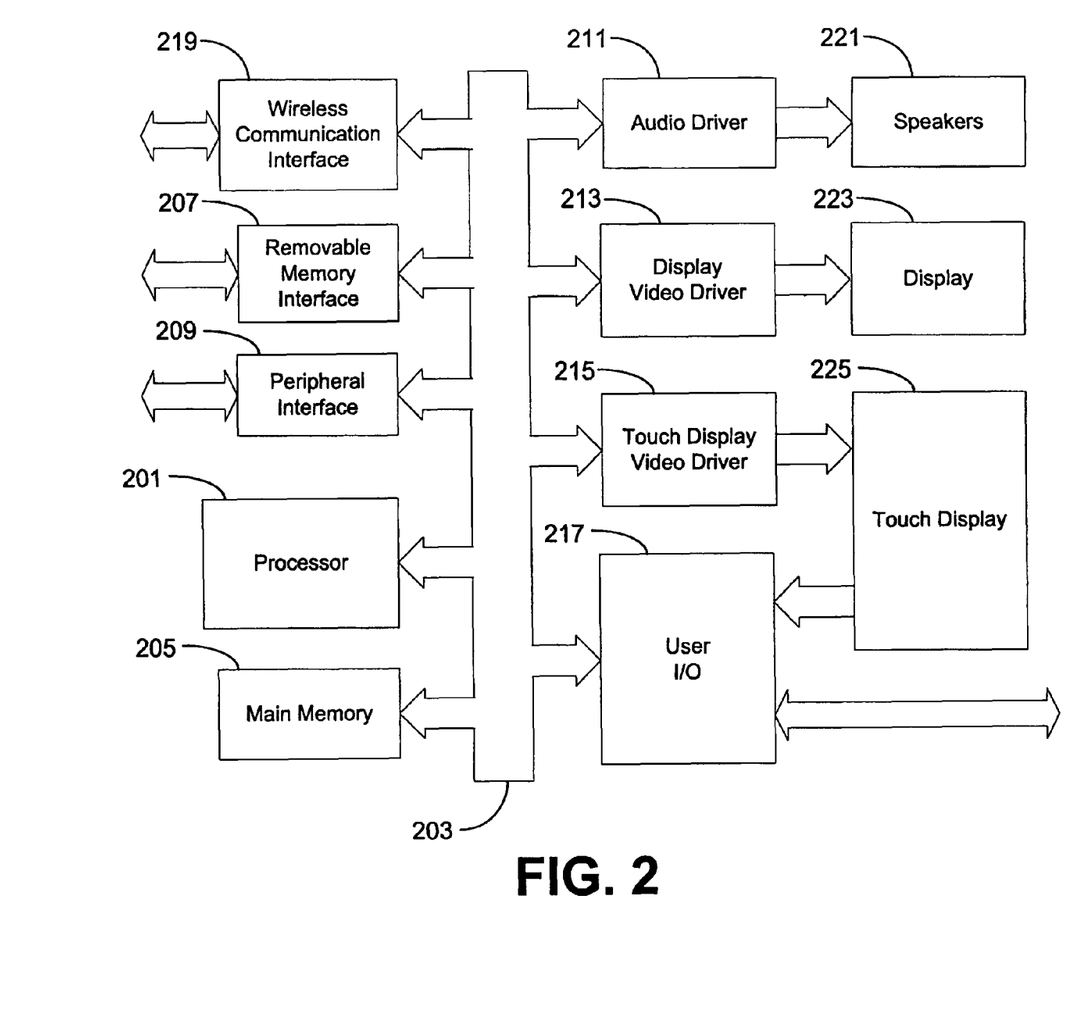
FIG. 2 is an example of a block diagram of a processing unit of the handheld gaming device in accordance with aspects of the invention.

FIG. 2 is an example of a block diagram of a processing unit of the handheld gaming device in accordance with aspects of the invention. In the embodiment of FIG. 2, the processing unit includes at least one processor connected to various other internal components via a system bus 203. The other components may include, for example, a main memory 205, a removable memory interface 207, a peripheral interface 209, an audio driver, 211, a video driver 213 for a first display 223, a video driver 215 for a second display 225 which may be a touch display, a user input/output interface 217, and a wireless communication interface 219. In other embodiments of the invention, the processing unit may include various different combinations of components depending on the particular application of each embodiment.

In operation, the processor of the handheld gaming device executes video game instructions to facilitate game play for a particular video game. The processor utilizes the different components of the processing unit as needed to facilitate video game play. In many embodiments, video game instructions for a specific video game are stored on a removable memory source, such as a video game cartridge, inserted into the removable memory interface. The processor may retrieve the video game information via the removable memory interface, and may process the video game instructions in accordance with general program instructions located in the main memory of the handheld gaming device. In addition, the processor may receive user generated input signals from various sources, for example, the user input/output interface, which may include input signals generated by input buttons or a touch display as was seen with respect to FIG. 1, or for example, a peripheral device communicating with the processor through the peripheral interface. The processor processes the various instructions and user input signals to generate audio and video data associated with proper execution of the video game.

The processor sends generated audio and video data, respectively, to audio and video drivers available in the processing unit of the handheld gaming device. Audio data may be directed to the audio driver, which processes the data into audio output signals, which it may then send to audio output devices, such as speakers 221. Video data may be directed to one or more video drivers, depending on how many display screens are available on the handheld gaming device. For the handheld gaming device of FIG. 1, there are two displays, and therefore two corresponding video drivers. Video data associated with the first display 223 are directed to display video driver 213, which processes the data into video outputs displayable on the first display. Likewise, video data associated with the second display 225, which in embodiments of the invention may be a touch display, are directed to display video driver 215, which processes the data into video outputs displayable on the second display.

Furthermore, a wireless communication interface may be available to, for example, connect separate handheld gaming devices either in close proximity, or in remote locations through the Internet. The wireless communication interface may be utilized to facilitate multiplayer game play between users of different handheld gaming devices, whereby game play information may be communicated between two or more devices in a collaborative or competitive manner to further enhance enjoyment of particular video games.

Figure 3:
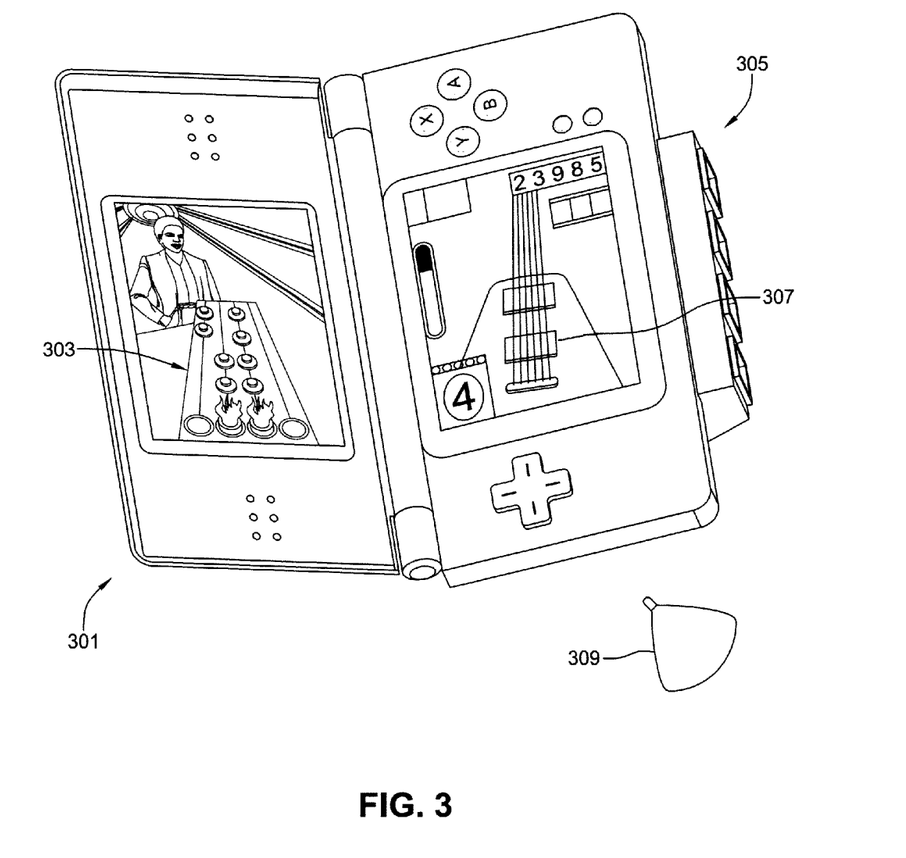
FIG. 3 is an example of a video game system executing a guitar-based music video game in accordance with aspects of the invention.

FIG. 3 is an example of a video game system executing a guitar-based music video game in accordance with aspects of the invention. The video game system includes a handheld gaming device 301, an optional peripheral device 305 attached to the handheld gaming device, and, optionally, for ease of use, a separate stylus 309 for actuating a touch screen of the handheld gaming device. In the embodiment of FIG. 3, the peripheral device includes a plurality of fret inputs designed to simulate chord fingerings on strings of a guitar. In FIG. 3, the stylus is designed to simulate a guitar pick, and a tip of the stylus is preferably designed so that it may repeatedly make contact with a touch screen of the handheld gaming device without causing damage to the handheld gaming device. Alternatively, a more conventional stylus, or even a finger of a user, may be used as an actuation device against the touch screen.

The handheld gaming device of FIG. 3 includes two screen shots of video game play of a guitar-based music video game. A first screen shot includes a music track 303 with instructive cues including information on how to operate the fret inputs on the peripheral device and timing of strums performed using the guitar pick stylus. A second screen shot is displayed on a touch screen and includes a portion of a guitar with strings 307. In game play, users may observe the first screen for instructions on how to operate the fret inputs and the guitar pick stylus, while performing different fret combinations on the peripheral device and running the guitar pick stylus across the guitar strings displayed on the second screen, or alternatively, any area on the second screen including touch sensitive properties.

FIGS. 4a-4d are touch screen displays including examples of different stroke motions on touch screen displays in accordance with aspects of the invention. The stroke motions may be visualized as vectors. In some embodiments, the touch screen displays of FIGS. 4a-4d represent the touch screens as have been discussed with respect to FIG. 1 and FIG. 3. In these embodiments, the stroke motion vectors presented in FIGS. 4b-4d may be attempted strums performed on the touch screen.

Figure 4A:
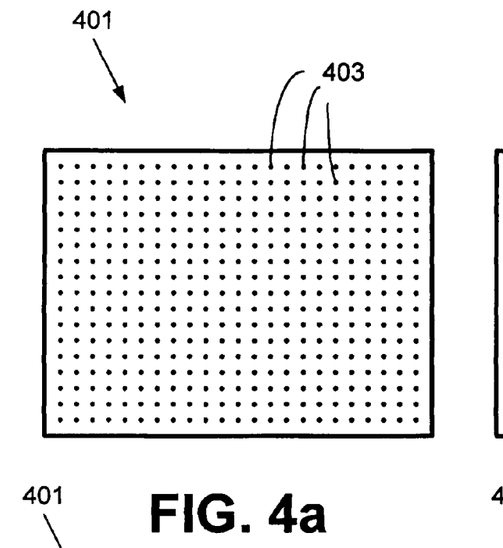
FIGS. 4a-4d are touch screen displays including examples of different strokes on touch screen displays in accordance with aspects of the invention.

FIG. 4a is a touch screen display 401 displaying an array of equidistant sensor points or markers, for example, sensor points 403. Sensor points may be arbitrary markers defined by game programmers to track actuation along the touch screen display, and may be positioned in a variety of ways depending on the application. For example, in a music video game, sensor points may be spaced four pixels apart on the touch screen display. In some embodiments of the invention, a stroke motion across the touch screen display may only be recognized as a strum if certain stroke prerequisites involving the sensor points are met. A stroke may be defined as a touching of an actuator along the surface of the touch screen display, and a subsequent motion in one or more directions along the surface of the touch screen display. The prerequisites may include, for example, a minimum number of sensor points actuated along a path of the stroke motion, or for example, a minimum angle change along the path based on the sensor points actuated along the path. For example, a path generated by a stroke may only be processed as a strum if two or more sensor points are touched along the path of the stroke. Such a prerequisite may exclude taps on the touch screen display, whether they be intentional or involuntary, from being processed as strums. The described prerequisites and other similar preconditions may be set and adjusted at the design level by programmers of the video game, and in some embodiments may be further adjusted by users of the video game. For example, some embodiments of the invention may provide for a strum calibration option, whereby examples of a user's typical or normal strumming motion across the touch screen display is saved by the processor of the handheld gaming device for use in determining if a strum has occurred. Such a calibration option may provide for more accurate strum detection and more personalized and enjoyable video game play.

Figure 4B:
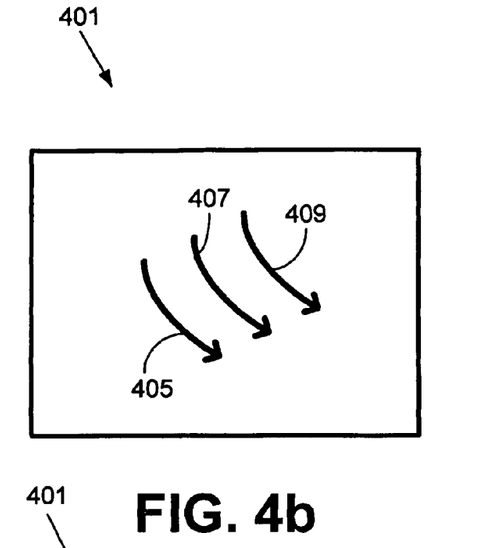

FIG. 4b is the touch screen display 401 including examples of stroke motion vectors in a first direction 405, 407, and 409. As described with respect to FIG. 4a, a stroke motion in a first direction 405 may be processed by the processor of the handheld gaming device as a strum in the context of the music video game if certain prerequisites involving the sensor points are met. After a successful strum has been performed, users may elect to lift the actuator from the touch screen display, ceasing contact between the actuator and the surface of the touch screen display, and reinitiate contact with the touch screen display to perform a subsequent strum 407 similar in motion to the first stroke motion. In this manner, a further stroke motion 409 and still further stroke motions may be executed to perform strums in the context of video game play.

Figure 4C:
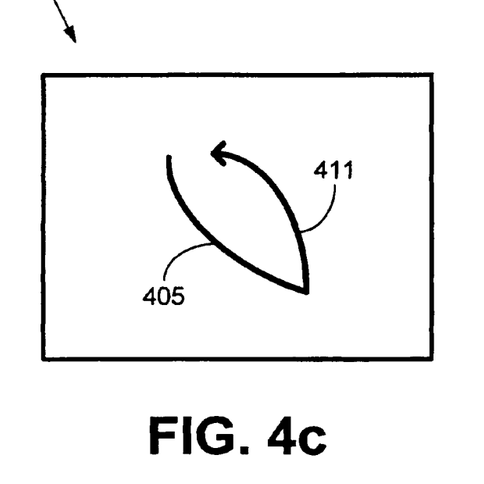

FIG. 4c is the touch screen display 401 including an example of a stroke motion in a first direction 405 and a stroke motion in a second direction 411. In some instances, a user may prefer to perform strums in two directions, simulating upwards and downwards strums on a real guitar. Stroke motions in a second direction may have a separate set of prerequisites or preconditions in order to be processed as successful strums. Separate prerequisites may be set to exclude, for example, slight or minor involuntary movements in a second direction from being processed as a strum after a strum in a first direction has been properly executed. The prerequisites may include a higher sensor point actuation requirement, for example, four or five sensor points along the path of the second stroke motion, or a minimum direction change requirement, for example, at least a 145 degree, or at most a 215 degree, direction change from the direction of the first stroke motion. In most embodiments, users may elect to continue contact with the touch screen and perform additional stroke motions. In many of these embodiments, the additional stroke motions may be processed as strums if prerequisites similar to the prerequisites for the stroke motions in the second direction are satisfied. That is, there may be a first set of prerequisites for successfully performing a strum in a first direction, and a second set of prerequisites for successfully performing a strum in a second direction and for further directions thereafter.

Figure 4D:
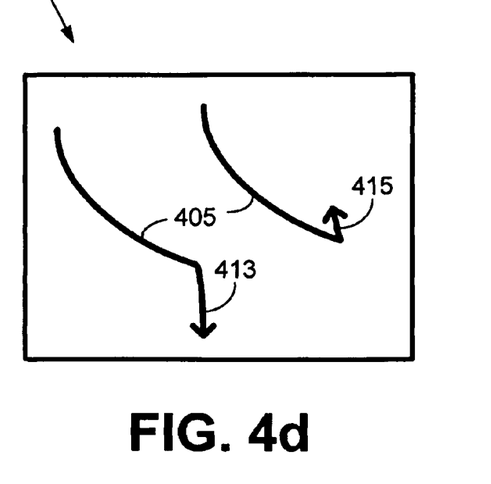

FIG. 4d is the touch screen display 401 including two examples of stroke motion vectors in a second direction 413 and 415 which may not be processed as strums. Each of the stroke motions in a second direction is performed after a successful strum in a first direction 405. One of the second stroke motions 413 comes at the tail end of a successful strum, wherein the direction of the second stroke motion deviates less than 90 degrees from the successful strum. Using the prerequisites defined with respect to the discussion in FIG. 4c, such a stroke motion may not be processed by the processor of the handheld gaming device as a strum, since it may not meet a minimum direction change prerequisite. Another of the second stroke motions 415 also comes at the tail end of a successful strum, wherein the second stroke motion is very short in length. Again, based on the prerequisites defined with respect to FIG. 4c, such a stroke motion may not be processed by the handheld gaming device as a strum, since it may not meet a heightened minimum sensor point actuation prerequisite for stroke motions in a second direction.

In occurrences where a first stroke motion may not have been processed as a strum, a stroke motion following the first stroke motion may nevertheless be processed as a successful strum. In some embodiments, the second stroke motion may be processed as a further stroke motion, and may be processed as a strum only if a heightened set of prerequisites of further stroke motions is met or satisfied. In other embodiments, the second stroke motion following an unsuccessful strum may be processed using the set of prerequisites for a first strum, thereby lowering the strum requirements for a second stroke motion for these limited cases.

Figure 5:
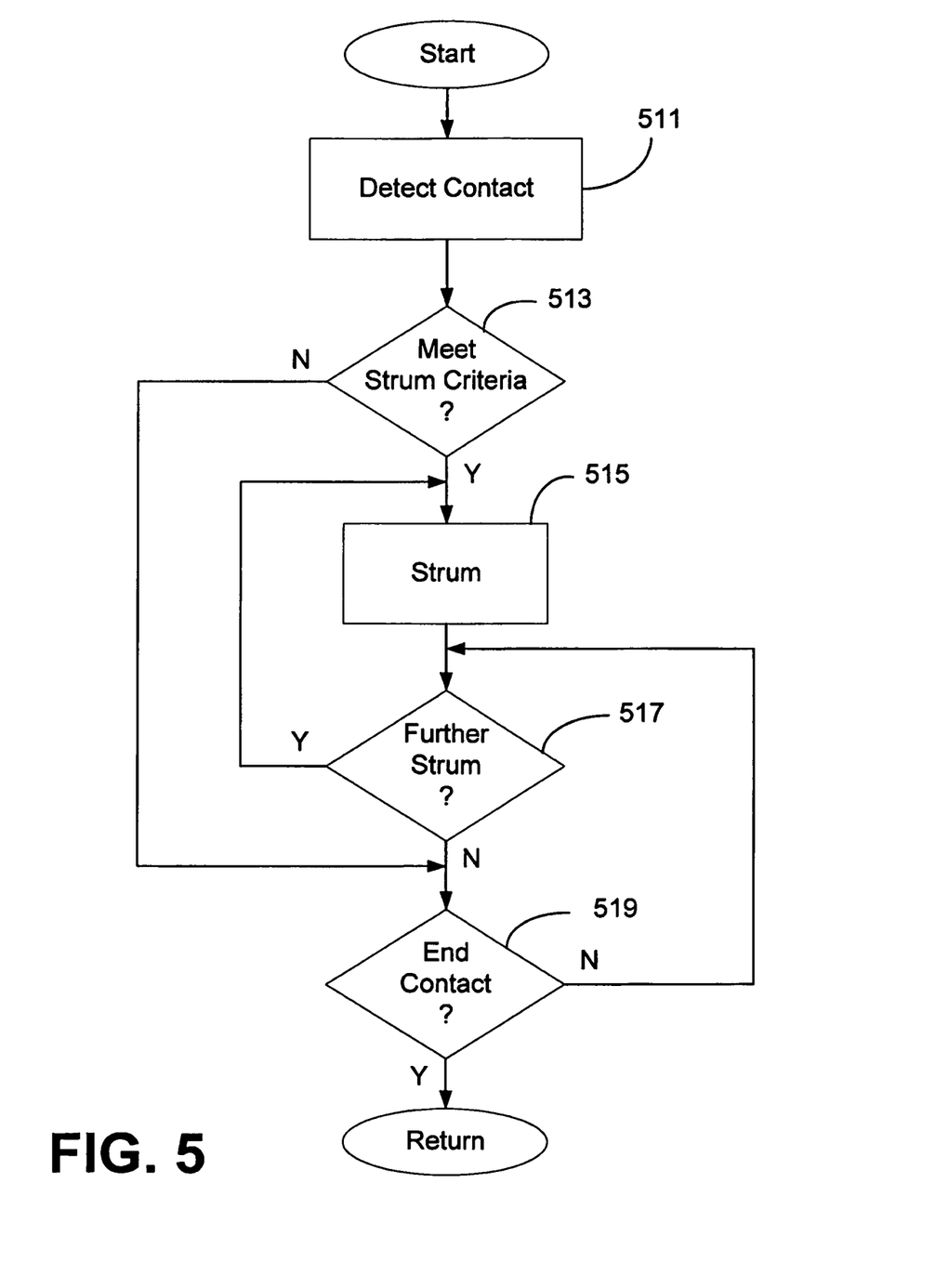
FIG. 5 is a flow diagram of the process of determining strums over the course of one instance of contact with a touch screen display in accordance with aspects of the invention.

FIG. 5 is a flow diagram of the process of determining strums over the course of one instance of contact with a touch screen display in accordance with aspects of the invention. In some embodiments, the process of FIG. 5 may be performed using the touch screen displays described with respect to the handheld gaming devices in FIG. 1 and FIG. 3, and may be indicative of the process involved in determining whether successful strums were executed with respect to the various stroke motions described with respect to FIGS. 4b-4d. In most embodiments, the process is performed using a processor of a handheld gaming device, with the processor configured by program instructions stored in memory.

In block 511, the process detects contact with the touch screen display. In most embodiments, contact is detected when a finger, a stylus, or another comparable actuator is depressed against the surface of the touch screen display. In the context of a guitar-based music video game as has been described herein, the contact may be made against the surface of the second display screen, which may include a screen shot of a guitar with guitar strings.

In block 513, the process determines whether a stroke motion, if any, made after an initial detected contact meets the criteria for a successful strum. After contact has been made to the touch screen display, a user may simply cease the contact without moving the contact point, or may continue the contact with the touch screen display and move the contact point in any direction along the surface of the touch screen display. Movements along the surface of the touch screen display may be considered strokes or stroke motions. To be processed as a strum, a stroke motion may be required to meet certain criteria or prerequisites, for example, a minimum stroke motion length, or for example, movement in one direction without excess deviation from the one direction. Such criteria may be based on programming by video game designers, and may in some embodiments be adjustable by users to suit each individual user's preferences. In various other embodiments involving other video games, the criteria may be different based on the application of each individual video game. If the criteria for executing a successful strum are met, the process proceeds to block 515. If the criteria for executing a successful strum are not met, the process instead proceeds to block 519.

In block 515, the process processes a successful strum. In the context of the guitar-based music video game as has been described, a successful strum may include information on, for example, the time of the successfully executed strum, as well as information on a fret combination being executed on a peripheral device at the time of the successfully executed strum. The information may be compared against, for example, instructive cues presented to users, to determine a compliance level of user operation of the handheld gaming device to the instructive cues. The information may also be processed based on video game instructions to generate audio and video outputs characterizing game play of the music video game. In some embodiments, an indicator, for example, a visual strum detection indicator or auditory feedback, may be activated when a strum is performed, to indicate to a user that a strum has been performed successfully.

In block 517, the process determines whether a further strum has been executed after a successful strum. In most embodiments of the invention, a further strum is defined as a strum executed after a preceding strum or stroke motion, without ending contact with the touch screen display. In other words, a further strum is a strum executed at the tail end of a first stroke motion, in a different direction than the first stroke motion. In some embodiments, the criteria for determining execution of a successful further strum may be different, often more extensive, than the criteria for determining execution of a successful first strum. A more detailed discussion of the different criteria which may be employed for determining successful execution of a further strum may be found with respect to FIG. 6 below. If a further strum is successfully executed, the process returns to block 515 to process a successful strum. If instead a further strum is not successfully executed, the process proceeds to block 519.

In block 519, the process determines whether contact between the actuator and the touch screen display has ended. Generally, contact ends when a user lifts the actuator from the surface of the touch screen display, so that there is no longer a contact point between the actuator and the surface of the touch screen display. If the process determines that there is still contact between an actuator and the touch screen display, the process returns to block 517 to determine if a further strum is being executed. If instead the process determines that the user has lifted the actuator from the surface of the touch screen display and ended contact, the process returns.

Figure 6:
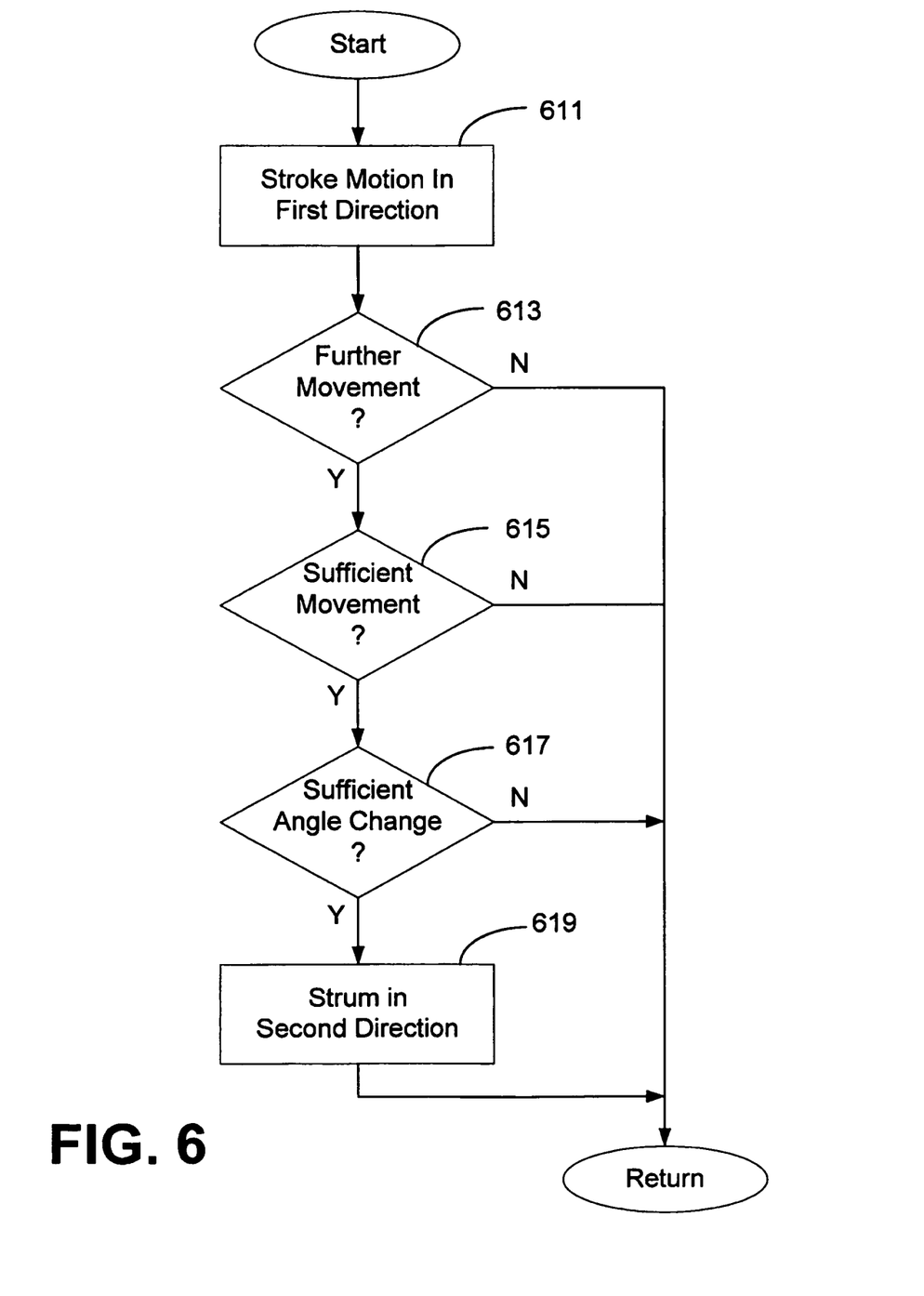
FIG. 6 is a flow diagram of a process of determining whether a further strum has been successfully executed in accordance with aspects of the invention.

FIG. 6 is a flow diagram of a process of determining whether a further strum has been successfully executed in accordance with aspects of the invention. In most embodiments, a further strum may be executed in a second direction along a surface of a touch screen display after an initial stroke motion has been previously performed in a first direction on the touch screen display. In some embodiments, the process of FIG. 6 may be performed in block 517 of the process of FIG. 5. Criteria for successfully executing a further strum may be different than the criteria for successfully executing an initial strum, and in many instances are more difficult to meet than initial strum criteria. The more stringent criteria may be implemented to prevent residual motion after an initial strum from being processed as an unwanted further strum. For example, after an initial strum, a user may unintentionally continue contact with the touch screen display and move an actuator in a second direction a short distance. Excluding such residual motion from being processed as further strums may be desirable for more accurate game processing and a more enjoyable game play experience.

In block 611, the process receives a stroke motion in a first direction. In some embodiments, the stroke motion may be required to be a successful strum. In other embodiments, the stroke motion may simply be a motion in an initial direction different than the direction of a subsequent further movement, whether the motion in the initial direction resulted in a successful strum or not.

In block 613, the process determines whether a further movement is detected. A further movement may be defined in the context of the invention as a movement in a direction different than the direction of an initial stroke motion as was described with respect to block 611. Generally, a further movement may be considered a stroke motion in a second direction. If a further movement is detected, the process proceeds to block 615. If a further movement is not detected, the process returns.

In block 615, the process determines whether the further movement is of a sufficient distance to be considered a strum. In some embodiments, a distance of a stroke motion is determined by measuring the distance between a starting point of the stroke motion and a terminating point of the stroke motion. In other embodiments, a distance may be measured by the number of sensor points or markers intersected by a particular stroke motion, wherein one potential arrangement of a sensor point array was discussed with respect to FIG. 4a. In such embodiments, a distance prerequisite for an initial strum may be, for example, two or three sensor points in length, whereas a distance prerequisite for a further strum may be heightened, for example, four or five sensor points in length. If the further movement is of a sufficient distance, the process proceeds to block 617. If, however, the further movement is not of a sufficient distance, the process returns.

In block 617, the process determines whether the direction of the further movement deviates from a preceding stroke motion sufficiently, that is, whether there is a sufficient angle change between the direction of an initial stroke motion and the direction of the further movement. On a real guitar, if a guitar pick is not lifted and/or repositioned, a first strum is generally followed by a second strum in the opposite direction. For example, a strum in one direction across a plurality of guitar strings is generally followed by a strum in the opposite direction across the same guitar strings. A second strum in the same or similar direction as the first strum would not generate any sound, as there would be no more guitar strings to traverse. Similarly, a second strum in a direction perpendicular to the first strum would involve movement parallel to the guitar strings, and would likewise generate no sound.

To enhance accuracy of the guitar simulation in the music video game, a criteria may be established whereby a second stroke motion is recognized as a further strum only when the direction of the second stroke motion is opposite, or sufficiently opposing of, the direction of the initial stroke motion. In some embodiments, a prerequisite of a second strum may be, for example, that the direction of the second stroke motion deviate at least 145 degrees from the direction of a stroke motion immediately preceding the second stroke motion. If the further movement involves a sufficient angle change, the process proceeds to block 619. If the further movement does not involve a sufficient angle change, the process instead returns.

In block 619, the process processes a strum in a second direction. In the process of FIG. 6, a successful strum is registered if the prerequisites described with respect to blocks 613, 615, and 617 are satisfied. In alternative embodiments of the invention, different sets of criteria may be implemented, based on the particular application of each alternative embodiment. After strum processing, the process returns.

The invention therefore provides for strum processing for a music video game on a handheld video game device. Although the invention has been described with respect to certain embodiments, it should be recognized that the invention may be practiced other than as specifically described, the invention comprising the claims and their insubstantial variations supported by this disclosure.

What is claimed is:

1. A handheld music video game device including a face and a side wall, the side wall being in an abutting configuration relative to the face, comprising:
   a display, the display being disposed on the face of the device;
   a touch screen input;
   a plurality of fret input buttons, the plurality of fret input buttons being linearly arranged on the side wall of the device; and
   a processor, the processor including program instructions for:
      commanding a display of instructive cues on the display, the display of instructive cues corresponding to the linearly arranged plurality of the fret input buttons, the instructive cues indicating desired operation of the touch screen input and the plurality of fret input buttons, and further indicating a target timing of the desired operation of the touch screen input and the plurality of fret input buttons;
      receiving a strum along the surface of the touch screen input;
      receiving status information of the plurality of fret input buttons at the time of the strum;
      determining compliance with the instructive cues; and
      generating audio and video output information based on accuracy of compliance;
   wherein a strum is received when properties of an actuation along the surface of the touch screen input meet a set of predefined criteria.

2. The handheld music video game of claim 1, wherein determining compliance with the instructive cues includes comparing a timing of the strum and the status information of the plurality of fret input buttons with a corresponding set of instructive cues.

3. The handheld music video game of claim 1, wherein a set of predefined criteria includes a minimum distance of actuation along the surface of the touch screen input.

4. The handheld music video game of claim 1, the program instructions further including instructions for displaying an image of at least a portion of a guitar on the touch screen input.

5. The handheld music video game of claim 1, wherein the set of predefined criteria includes an actuation along the surface of the touch screen input in a first direction intersects at least a plurality of sensor points of the touch screen input.

* * * * *